(12) United States Patent
Kanayama

(10) Patent No.: US 7,556,300 B2
(45) Date of Patent: Jul. 7, 2009

(54) FINGER UNIT FOR ROBOT HAND

(75) Inventor: Naoki Kanayama, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 323 days.

(21) Appl. No.: 11/600,714

(22) Filed: Nov. 17, 2006

(65) Prior Publication Data
US 2007/0158964 A1    Jul. 12, 2007

(30) Foreign Application Priority Data
Jan. 12, 2006   (JP)  .............................. 2006-004847

(51) Int. Cl.
*B25J 15/08* (2006.01)
(52) U.S. Cl. ........................................ 294/106; 901/38
(58) Field of Classification Search ................. 294/106; 901/31–34, 38, 39; 623/64
See application file for complete search history.

(56) References Cited

U.S. PATENT DOCUMENTS

| | | | |
|---|---|---|---|
| 4,367,891 A | * | 1/1983 | Wauer et al. .................. 294/88 |
| 4,452,479 A | * | 6/1984 | Terai et al. .................... 294/88 |
| 4,821,594 A | * | 4/1989 | Rosheim et al. .......... 74/490.05 |
| 6,247,738 B1 | * | 6/2001 | Winkel et al. ................ 294/111 |
| 7,168,748 B2 | * | 1/2007 | Townsend et al. ........... 294/106 |

FOREIGN PATENT DOCUMENTS

JP    2004-122339 A    4/2004

* cited by examiner

*Primary Examiner*—Dean J Kramer
(74) *Attorney, Agent, or Firm*—Buchanan Ingersoll & Rooney PC

(57) ABSTRACT

A finger unit of a robot hand has a first rotational actuator, a first finger joint part, a first finger linkage, a second finger joint part, and a second finger linkage that are connected in this order. A second rotational actuator is attached to the first finger linkage. The first finger linkage swivels about the first finger joint part by the first rotational actuator, and the second finger linkage swivels about the second finger joint part by the second rotational actuator. The second rotational actuator is attached to the first finger linkage so as to be in a slantwise orientation relative to a straight line connecting a center of rotation of the first finger joint part and a center of rotation of the second finger joint part. With this configuration, an axial length of the finger unit of a robot hand can be shortened.

2 Claims, 4 Drawing Sheets

FINGER UNIT FOR ROBOT HAND

BACKGROUND OF THE INVENTION

1. Field of the Invention

The present invention relates to a finger unit for a robot hand.

2. Description of the Related Art

Finger units used in robot hands are commonly configured with multiple joints. Conventionally, crank mechanisms, worm gears, wire and sheave systems, combinations of screws with rack and pinions, and other structures have been employed in order to convert rotation that is output from the rotational output shaft of an actuator of a multiple joint finger unit into the rotational movement of a joint shaft perpendicular thereto. However, problems are presented with all of these configurations, such as the large dimensions required for the joint part. Additionally, conventional fingers for the most part have joints that, when linked to other fingers, only bend to the inside of the hand. Complications arise when the fingers are made to perform cooperative tasks therebetween or to perform a variety of other movements in association with the palm of the robot hand.

In view of such problems, the present inventors proposed in JP-A 2004-122339 a finger unit that moves in a manner much faster and much more precisely than the operation of organs of human body which begins with visual awareness, and is suited for use in robot hands.

SUMMARY OF THE INVENTION

An object of the present invention is to provide a finger unit which is constituted similar to that proposed in the above patent document and has an advantageous configuration wherein the total length of a finger unit is shortened.

In order to achieve the above and other objects, the present invention provides a finger unit of a robot hand that comprises:

a first rotational actuator, a first finger joint part, a first finger linkage, a second finger joint part, and a second finger linkage that are connected in this order, and a second rotational actuator attached to the first finger linkage; wherein the first finger linkage swivels about the first finger joint part by means of the first rotational actuator;

the second finger linkage swivels around the second finger joint part by means of the second rotational actuator; and wherein the second rotational actuator is attached to the first finger linkage so as to be in a slantwise orientation relative to a straight line passing though a center of rotation of the first finger joint part and a center of rotation of the second finger joint part.

In the finger unit of a robot hand according to the present invention, the second rotational actuator is attached slantwise with respect to the first finger linkage. When the second rotational actuator is coaxially attached to the first finger linkage, the length of the first finger linkage cannot be made shorter than the length of the second rotational actuator. The second rotational actuator is attached slantwise in the present invention; therefore, the length of the first finger linkage is not constrained to the length of the second rotational actuator and can be shortened. A finger unit with a short total length can thereby be realized.

Next, the present invention provides a finger unit of a robot hand comprising:

an attachment flange;

a first rotational actuator attached to the attachment flange, a rotational output shaft of the first rotational actuator that passes through the attachment flange and protrudes forwardly;

a first drive-side bevel gear coaxially fixed to a distal end part of the rotational output shaft;

a pair of first bearing housings that extend forward and pass through both sideward positions of the first drive-side bevel gear from a front surface of the attachment flange;

first bearings-attached to the respective first bearing housings;

a first joint shaft rotatably supported on both ends by the first bearings and arranged in a direction perpendicular to the central axis line of the rotational output shaft of the first rotational actuator;

a first driven-side bevel gear coaxially fixed to the first joint shaft and engaged with the first drive-side bevel gear;

a first finger linkage extending in the direction perpendicular to the first joint shaft and having a rear end part fixed to the first joint shaft;

a second rotational actuator attached to a forward end part of the first finger linkage;

a rotational output shaft of the second rotational actuator that passes through the forward end part of the first finger linkage and protrudes forwardly;

a second drive-side bevel gear coaxially fixed to a distal end part of the rotational output shaft;

a pair of second bearing housings that extend forward and pass through both sideward positions of the second drive-side bevel gear from a front end part of the first finger linkage;

second bearings attached to the respective second bearing housings;

a second joint shaft rotatably supported on both ends by the second bearings and arranged in a direction perpendicular to a central axis line of the rotational output shaft of the second rotational actuator;

a second driven-side bevel gear coaxially fixed to the second joint shaft and engaged with the second drive-side bevel gear; and a second finger linkage extending in a direction perpendicular to the second joint shaft and having a rear end part fixed to the second joint shaft, wherein the second rotational actuator is attached to the first finger linkage so as to be in a slantwise orientation relative to a straight line passing through a center of rotation of the first finger joint part and a center of rotation of the second finger joint part.

In the finger unit of the present invention, the finger joint parts are configured using bevel gears, so that the rotational power of the rotational actuator is converted into a swiveling motion of the first finger linkage or the second finger linkage. Using bevel gears enables a small-sized, compact configuration to be employed for the finger joint parts and, further, makes for straightforward implementation of a configuration wherein the second rotational actuator is attached slantwise with respect to the first finger linkage.

In the finger unit of a robot hand of the present invention, the second rotational actuator is attached slantwise with respect to the first finger linkage, which connects the first and second finger joint parts. Therefore, the length of the first finger linkage can be shortened without being constrained to the length of the second rotational actuator, and a finger unit having a short total length can be realized. In the case of multiple-joint finger units in particular, finger units having a short total length can be realized by positioning each rotational actuator in a slantwise manner.

DESCRIPTION OF THE PREFERRED EMBODIMENTS

A finger unit of a high-speed robot hand pertaining to the present invention will be described below with reference to the accompanying drawings.

Figure 1:
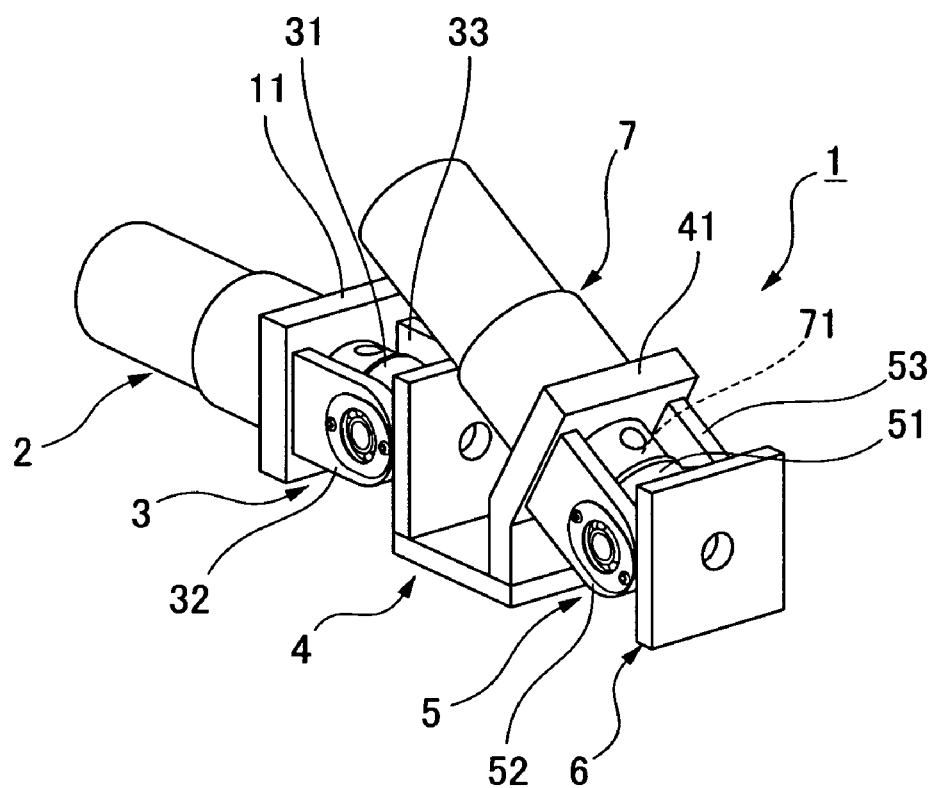
FIG. 1 is a perspective view showing a finger unit of a high-speed robot hand in which the present invention is used.
Figure 2:
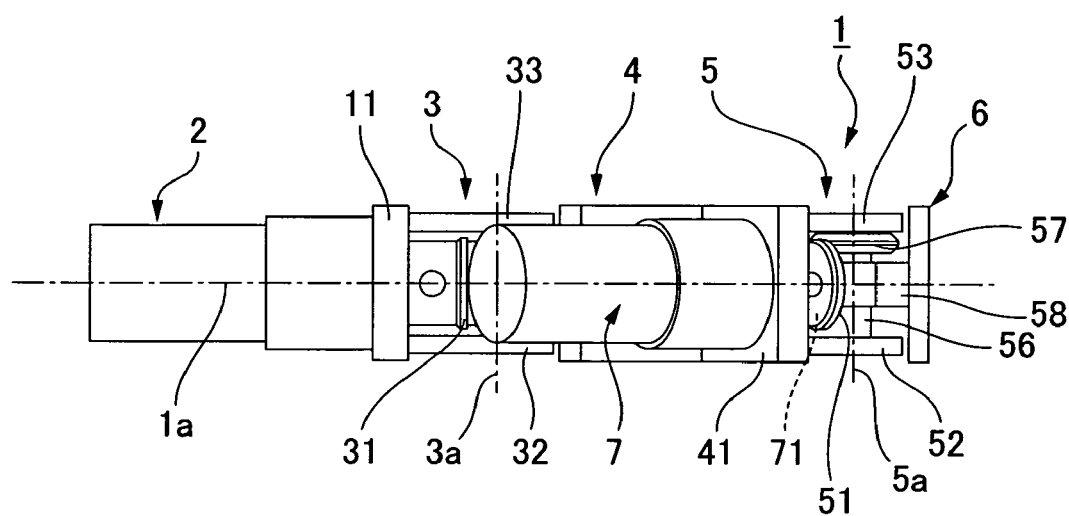
FIG. 2 is a plan view of the finger unit of FIG. 1.
Figure 3:
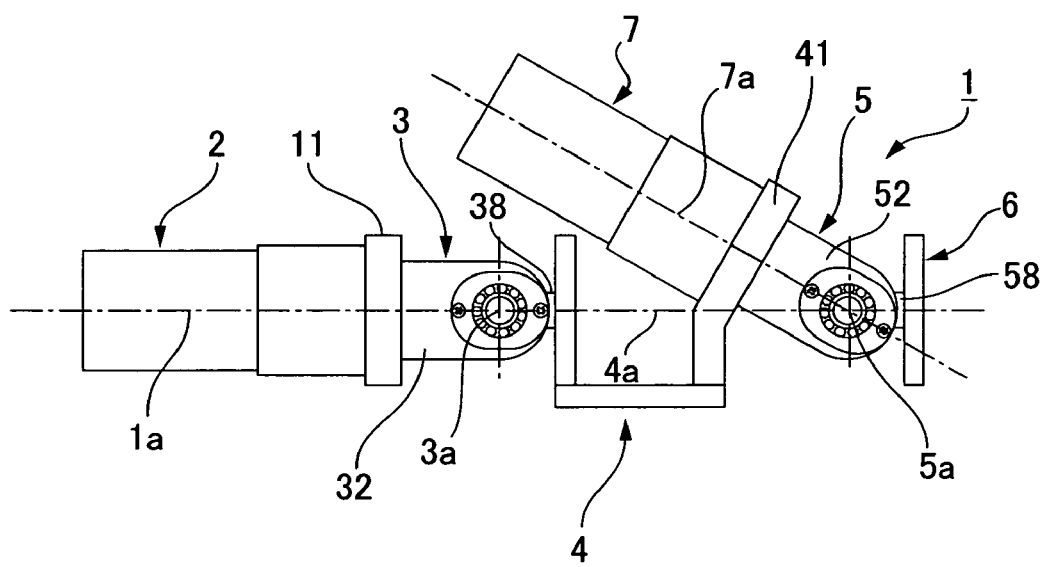
FIG. 3 is a side view of the finger unit of FIG. 1.
Figure 4A:
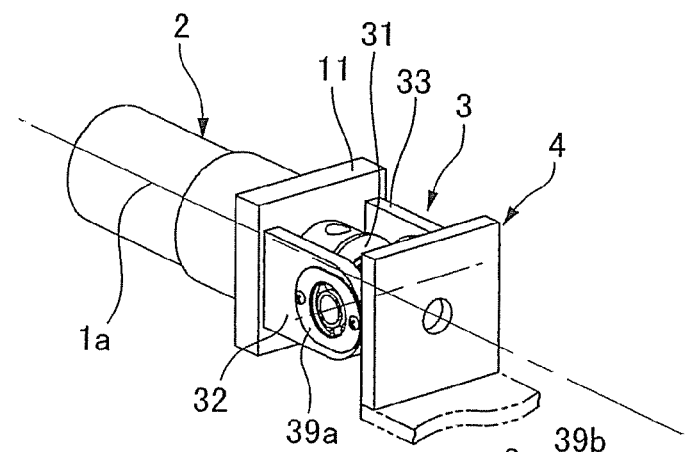
FIGS. 4A, 4B, 4C, and 4D are perspective, plan, sectional, and side views showing the first rotational actuator, the first finger joint part, and the first finger linkage of the finger unit.
Figure 4B:
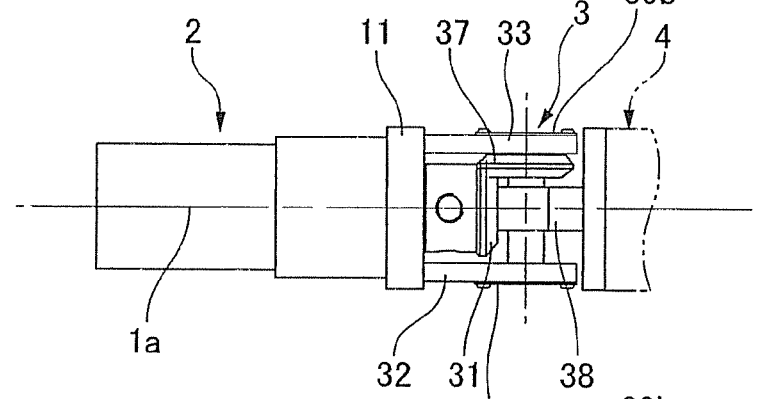
Figure 4C:
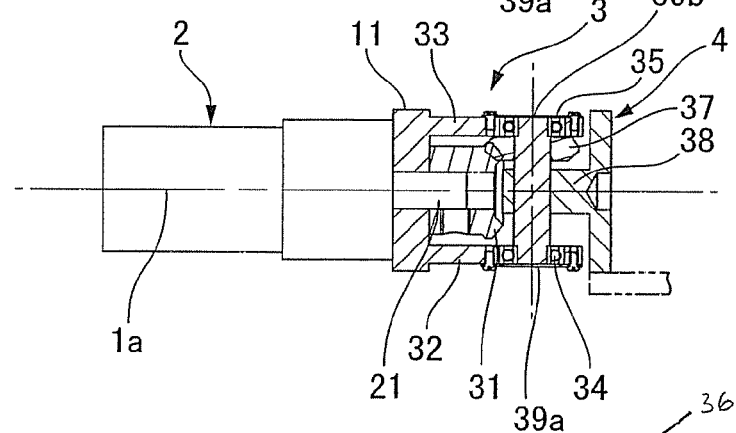
Figure 4D:
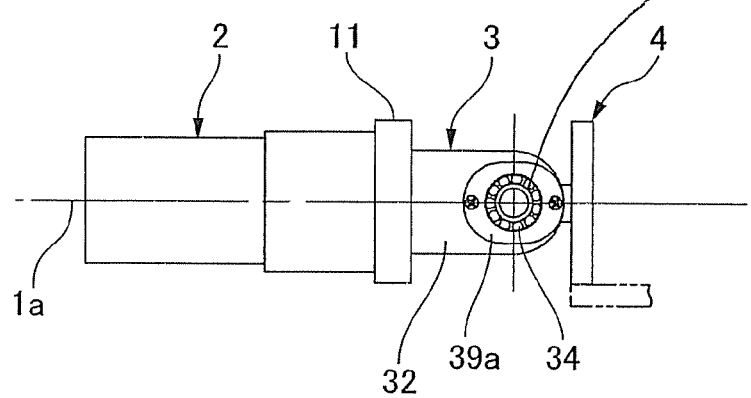

FIGS. 1, 2, and 3 are perspective, plan and side views showing a finger unit of a high-speed robot hand according to the present embodiment.

A finger unit 1 of a robot hand has a first rotational actuator 2, a first finger joint part 3, a first finger linkage 4, a second finger joint part 5, and a second finger linkage 6 that are connected in this order. A second rotational actuator 7 is attached to the first finger linkage 4. The first finger linkage 4 swivels by means of the first rotational actuator 2 in a vertical direction within a prescribed angle centered on a first joint axis line 3a of the first finger joint part 3. The second finger linkage 6 swivels by means of the second rotational actuator 7 in a vertical direction within a prescribed angle centered on a second joint axis line 5a of the second finger joint part 5.

The finger unit 1 is shown in a neutral state in FIGS. 1 through 3. In this neutral state, the first rotational actuator 2, the first finger linkage 4, and the second finger linkage 6 are positioned on the central axis line 1a of the same unit. In contrast, the second rotational actuator 7 is attached to the first finger linkage 4 so as to be in a slanted orientation relative to a straight line passing though the center of rotation of the first finger joint part 3 and the center of rotation of the second finger joint part 5.

FIGS. 4A through D are a perspective view, a plan view, a sectional view, and a side view showing the first rotational actuator 2, the first finger joint part 3, and the first finger linkage 4 of the finger unit 1. The structures of the respective parts will be described in detail with reference to FIGS. 1 through 4.

The cylindrical first rotational actuator 2 has a forward end part secured to a rearward side of an attachment flange 11. A rotational output shaft 21 passes through the attachment flange 11 and protrudes forwardly.

The first finger joint part 3, which is connected to the first rotational actuator 2, has a first drive-side bevel gear 31 coaxially fixed to a distal end of the rotational output shaft 21. Two bearing housings 32, 33 extend in parallel from left and right edges of a front surface of the attachment flange 11 and pass through the sideward positions of the drive-side bevel gear 31. On the distal end part of the bearing housings 32, 33, which protrude farther forward than the drive-side bevel gear 31, ball bearings 34, 35 are mounted so as to be coaxially positioned with regard to the bearing housings. In the present embodiment, a joint shaft 36 is horizontally supported via these ball bearings 34, 35 in a direction perpendicular to the direction of the axis line of the rotational output shaft 21, with the left and right ends being in a rotatable state. A driven-side bevel gear 37 is coaxially fixed to one end of the joint shaft 36 in the axial direction thereof, and is engaged with the drive-side bevel gear 31. A rear end part of a connecting shaft 38 is secured midway along the joint shaft 36 in an axial direction.

The first finger linkage 4 is fixed and connected to the forward end part of the connecting shaft 38. As an example, a slanted plate part 41 that slants at a prescribed angle may be formed to the fore of the first finger linkage 4, where the second rotational actuator 7 is attached in a forward-facing state. The rotational output shaft 71 associated therewith protrudes forward from the cylindrical opening part of the slanted plate part 41. As is clear from FIG. 3, when viewed from the side, the central axis line 7a of the second rotational actuator 7 is slanted so that the rear side is above the central axis line 4a of the first finger linkage 4 that connects the centers of rotation of the first finger joint part 3 and the second finger joint part 5.

The first finger linkage 4 can accordingly be shortened, in contrast to when the second rotational actuator 7 is attached to the first finger linkage 4 so that the central axis line 7a of the second rotational actuator 7 is aligned with the central axis line 4a of the first finger linkage 4. In other words, the length extending from the center of rotation (3a) of the first finger joint part 3 to the center of rotation (5a) of the second finger joint part 5 can be shortened.

The second finger joint part 5, which is connected to the rotational output shaft 71 of the second rotational actuator 7 that is disposed at a slant as described hereinabove, has the same structure as the first finger joint part 3 discussed earlier. In other words, a drive-side bevel gear 51 is coaxially fixed to a distal end of the rotational output shaft 71. Two bearing housings 52, 53 extend in parallel from left and right edges of a front surface of the slanted plate part 41 of the first finger linkage 4 and pass through the sideward positions of the drive-side bevel gear 51. On the distal end part of the bearing housings 52, 53, which protrude farther forward than the drive-side bevel gear 51, ball bearings (not shown) are mounted so as to be coaxially positioned with regard to the bearing housings. A joint shaft 56, which extends in a direction perpendicular to the axial direction of the rotational output shaft 71, is rotatably supported on left and right ends thereof via the ball bearings. A driven-side bevel gear 57 is coaxially fixed to an end part of the joint shaft 56 in the axial direction thereof This driven-side bevel gear 57 is engaged with the drive-side bevel gear 51. A rear end part of a connecting shaft 58 is secured midway along the joint shaft 56 in an axial direction.

The second finger linkage 6 is attached to the forward end part of the connecting shaft 58 in a position perpendicular to the connecting shaft 58. A cylindrical fingertip member or other component may be attached to the second finger linkage 6.

The bevel gears 31, 37 and the bevel gears 51, 57 used in the respective finger joint parts 3, 5 are engaged without backlash. With reference being made to FIG. 4 for the following description, spring plates 39a, 39b are attached to the outer edge surface of the ball bearings 34, 35, which rotatably support the right and left ends of the joint shaft 36 in the first finger joint part 3. The spring plates 39a, 39b are used to add thrust in the axial direction in order to limit the amount of axial deviation of the joint shaft 36 with respect to the center of the bevel gear cone. In the same way, spring plates (not shown) that perform the same function are attached to the second finger joint part 5 on the fingertip side.

The present embodiment is a two-joint finger unit provided with a joint part on a finger attachment root side and a joint part on a fingertip side, but configurations provided with three or more joint parts are also possible.

In a finger unit 1 of a robot hand thus configured, the rotation of the rotational output shaft 21 of the first rotational actuator 2 is converted into rotational movement of the joint shaft 36 via the pair of bevel gears 31, 37. The first finger linkage 4, which is connected to the joint shaft 36 via the connecting shaft 38, swivels up and down within a prescribed angle about the joint shaft 36. Similarly, the rotation of the rotational output shaft 71 of the second rotational actuator 7 is converted into rotational movement of the joint shaft 56 via the pair of bevel gears 51, 57. The second finger linkage 6, which is connected to the joint shaft 56 via the connecting shaft 58, swivels up and down within a prescribed angle about the joint shaft 56. By controlling the drive of the first rotational actuator 2 and the second rotational actuator 7, the respective finger linkages 4, 6 can be made to swivel individually in a vertical direction relative to the linear, neutral state shown in the drawings.

The second rotational actuator 7 is attached in a slanted state at a prescribed vertical angle relative to the central axis line 4a of the first finger linkage 4. Therefore, in contrast to when these components are coaxially positioned, the first finger linkage 4 can be shortened without being constrained to the length of the second rotational actuator 7. Accordingly, a multiple-joint finger unit with a short total length can be realized. For example, if a multiple-joint finger unit is configured so that the second finger linkage 6 and the second rotational actuator 7 are connected in stages via a finger joint part, a multiple-joint finger unit with an extremely short total length can be realized.

What is claimed is:

1. A finger unit of a robot hand, comprising:
   a first rotational actuator, a first finger joint part, a first finger linkage, a second finger joint part, and a second finger linkage that are connected in this order, and
   a second rotational actuator attached to the first finger linkage; wherein
   the first finger linkage swivels about the first finger joint part by means of the first rotational actuator;
   the second finger linkage swivels around the second finger joint part by means of the second rotational actuator;
   the second rotational actuator is attached to the first finger linkage so as to be in a slantwise orientation relative to a straight line passing through a center of rotation of the first finger joint part and a center of rotation of the second finger joint part;
   a center line of a rotational output shaft of the first rotational actuator intersects with the center of rotation of the first finger joint part; and
   a center line of a rotational output shaft of the second rotational actuator intersects with the center of rotation of the second finger joint part.

2. A finger unit of a robot hand, comprising:
   an attachment flange;
   a first rotational actuator attached to the attachment flange;
   a rotational output shaft of the first rotational actuator that passes through the attachment flange and protrudes forwardly;
   a first finger joint part including a first drive-side bevel gear coaxially fixed to a distal end part of the rotational output shaft;
   a pair of first bearing housings that extend forward and pass through both sideward positions of the first drive-side bevel gear from a front surface of the attachment flange;
   first bearings attached to the respective first bearing housings;
   a first joint shaft rotatably supported on both ends by the first bearings and arranged in a direction perpendicular to the a central axis line of the rotational output shaft of the first rotational actuator;
   a first driven-side bevel gear coaxially fixed to the first joint shaft and engaged with the first drive-side bevel gear;
   a first finger linkage extending in the a direction perpendicular to the first joint shaft and having a rear end part fixed to the first joint shaft;
   a second rotational actuator attached to a forward end part of the first finger linkage;
   a rotational output shaft of the second rotational actuator that passes through the forward end part of the first finger linkage and protrudes forwardly;
   a second finger joint part including a second drive-side bevel gear coaxially fixed to a distal end part of the rotational output shaft of the second rotational actuator;
   a pair of second bearing housings that extend forward and pass through both sideward positions of the second drive-side bevel gear from a front end part of the first finger linkage;
   second bearings attached to the respective second bearing housings;
   a second joint shaft rotatably supported on both ends by the second bearings and arranged in a direction perpendicular to a central axis line of the rotational output shaft of the second rotational actuator;
   a second driven-side bevel gear coaxially fixed to the second joint shaft and engaged with the second drive-side bevel gear; and
   a second finger linkage extending in a direction perpendicular to the second joint shaft and having a rear end part fixed to the second joint shaft, wherein
   the second rotational actuator is attached to the first finger linkage so as to be in a slantwise orientation relative to a straight line connecting a center of rotation of the first finger joint part and a center of rotation of the second finger joint part.

* * * * *